(12) United States Patent
Yoo

(10) Patent No.: US 6,416,413 B1
(45) Date of Patent: Jul. 9, 2002

(54) ELECTRONIC CHIP CIRCULATION METHOD, ELECTRONIC CHIP CIRCULATION SERVER APPARATUS AND ELECTRONIC CHIPS CIRCULATION SYSTEM

(75) Inventor: Sung-Sam Yoo, Tokyo (JP)

(73) Assignee: Axle Linkage Labo Inc., Tokyo (JP)

(*) Notice: Subject to any disclaimer, the term of this patent is extended or adjusted under 35 U.S.C. 154(b) by 0 days.

(21) Appl. No.: 09/462,674

(22) PCT Filed: May 20, 1999

(86) PCT No.: PCT/JP99/02625

§ 371 (c)(1),
(2), (4) Date: Jan. 11, 2000

(87) PCT Pub. No.: WO99/60501

PCT Pub. Date: Nov. 25, 1999

(30) Foreign Application Priority Data

May 21, 1998 (JP) .................................. 10-139056

(51) Int. Cl.[7] .................................................. A63F 9/24
(52) U.S. Cl. .................................................. 463/42; 902/22
(58) Field of Search ......................... 463/25, 40, 42; 705/1, 14, 26–28, 35, 39–42, 53, 64–65, 68, 78, 404, 409; 235/379, 380; 902/22, 24

(56) References Cited

U.S. PATENT DOCUMENTS 5,930,777 A * 7/1999 Barber ..................... 705/40
6,110,042 A * 8/2000 Walker et al. ............ 463/25

FOREIGN PATENT DOCUMENTS

| JP | 63-14297 | 1/1988 |
| JP | 6-295390 | 10/1994 |
| JP | 11-154182 | 6/1999 |

* cited by examiner

Primary Examiner—Joe H. Cheng
Assistant Examiner—Kim T. Nguyen
(74) Attorney, Agent, or Firm—Armstrong, Westerman & Hattori, LLP

(57) ABSTRACT

A user can play a network game by using game client terminal 108 and can receive electronic chips according to the game score. The exchange rate from the score to the amount of electronic chips is dynamically determined by electronic chip issuance module 102 with cooperation by game server 109, referring to electronic chip condition calculation module 107. The user can purchase commodities by using Web-POS client terminal 110, and can receive discount as he or she wishes by using electronic chips which are issued to each of users. The exchange rate from electronic chips to the currency is dynamically determined by electronic chip consumption module 103 in cooperation with Web-POS server 111, referring to electronic chip condition calculation module 107. The ability to determine above-mentioned exchange rates generates various sales promotion effects.

31 Claims, 11 Drawing Sheets

FIG.2

| User ID | Game Category | Exchange Rate | Varid Period |
|---------|---------------|---------------|--------------|
|         |               |               |              |
|         |               |               |              |
|         |               |               |              |

FIG.3

| User ID | Varid Period | Issued Chip Amount | Consumed Chip Amount | Current Chip Balance | Expired Chip Amount |
|---|---|---|---|---|---|
| | | | | | |
| | | | | | |
| | | | | | |
| | | | | | |

FIG.4

Game Display

| Score of the Game | 2300 points |
|---|---|
| Present Exchange Rate | 0.01chips/1point |
| Acquired Chips by this pay | 23 chips |
| Valid period | 1998/07/31 |
| Present Total Chips Amount | 1450 chips |

FIG.5

| | | |
|---|---|---|
| Commodity Category : | Shoes<br>Consumer Electronics<br>Foods | |

| | | |
|---|---|---|
| Ordered commodity : | MD<br>CD<br>DVD | |

Quantity : 1

| Order | Delete | Ordered Commodity Details | Ordered Commodity Price : 43000 |
|---|---|---|---|

Electronic Chip Information

| Valid Period | 98/05 | Present Balance | 450 | Used Chips | 1000 | Rate | 5Yen/chip | Used Chips Equivalent | 5000 |
| Valid Period | 98/06 | Present Balance | 100 | Used Chips | 0 | Rate | 7Yen/chip | Used Chips Equivalent | 0 |
| Valid Period | 98/07 | Present Balance | 200 | Used Chips | 0 | Rate | 8Yen/chip | Used Chips Equivalent | 0 |

Total Order Value: ☐   Tax: ☐   Sub Total: ☐

| | Category | Vender Code | Commodity Number | Commodity Name | Unit Price | Quantity | Price |
|---|---|---|---|---|---|---|---|
| 1. | Shoes | 00019 | 00002 | White Shoes | 8000 | 1 | 8000 |
| 2. | Consumer Electronics | 00103 | 00231 | MD | 35000 | 1 | 35000 |
| 3. | | | | | | | |
| 4. | | | | | | | |
| 5. | | | | | | | |

FIG.6

| Client ID | Valid Period | Exchange Rate |
|---|---|---|
| | | |
| | | |
| | | |
| | | |
| | | |

FIG.7

| Period | User ID | Game Category | Access Count |
|--------|---------|---------------|--------------|
|        |         |               |              |
|        |         |               |              |
|        |         |               |              |
|        |         |               |              |
|        |         |               |              |

FIG.8

| Period | Client ID | Total Sales |
|---|---|---|
|  |  |  |
|  |  |  |
|  |  |  |

FIG.9

| User ID | Membership Period | Total Purchase |
|---------|-------------------|----------------|
|         |                   |                |
|         |                   |                |
|         |                   |                |
|         |                   |                |

FIG.11

| Company ID | Game Category | Chip Upper Limit | Issued Chip Amount | Exchange Rate | Valid Period |
|---|---|---|---|---|---|
|  |  |  |  |  |  |
|  |  |  |  |  |  |
|  |  |  |  |  |  |

ELECTRONIC CHIP CIRCULATION METHOD, ELECTRONIC CHIP CIRCULATION SERVER APPARATUS AND ELECTRONIC CHIPS CIRCULATION SYSTEM

TECHNOLOGY AREA

This invention is related to the technology for circulating electronic chips through communication networks.

BACKGROUND OF THE INVENTION

It is a well-known sales promotion method by a vendor or by a shopping area to distribute discount coupons or vouchers at the purchase of commodities by a user. The user can buy commodities at a discounted price at the next purchase by using such discount coupons or vouchers. Buying intention of users can be further accelerated by specifying the valid period for such coupons or vouchers or by limiting applicable commodities, which results in the enhanced sales promotion results.

Recent rapid introduction of computer networks or the Internet throughout the world has enabled services such as on-line shopping in a virtual mall on the Internet. It is also an already-known system where a server computer issues ticket data which are equivalent to the discount coupons mentioned above when a user orders a commodity using a Web purchase form, and the server stores and manages such data for each user in a database. In this system, the user can buy commodities at a discounted price according to the amount of accumulated ticket data, by notifying the system his or her ID number.

Such conventional systems, and technologies used for such systems, however, have a problem in that the ticket data distribution conditions should be predetermined according to commodities or vendors, thus limiting the sales promotion flexibility and effectiveness. For example, it is difficult for such systems to realize a period-limited sales promotion campaign targeting users who have ticket data already.

The purpose of this invention is to solve such problems of conventional systems and technologies, aiming at the realization of on-line discount functions that can support flexible and powerful sales promotion.

SUMMARY OF THE INVENTION

This invention is related to the technology for circulating electronic chips. By using the technology of this invention, electronic chips are issued as the response to predetermined operation by a user, according to predetermined issuance conditions. More specifically, electronic chips are issued, for example, as the result of playing a game or purchasing a commodity by the user. Conditions for the chip issuance may include the exchange rate between the score of the game played and the currency, and the valid period of chips issued.

The user becomes possible to use electronic chips according to predetermined conditions of electronic chip consumption, at the user's predetermined action of playing a game or purchasing a commodity. Such conditions include the exchange rate between the electronic chip unit and the currency unit, and the valid period of chips. The user will be provided with the information of user's electronic chips, such as the present balance, the valid period and the present exchange rate of chips.

Electronic chip issuance for and consumption by each user are recorded and managed as the record of the user. Chip issuance conditions and chip consumption conditions for the user are determined according to such record of electronic chip issuance and consumption.

Moreover, a record of predetermined chip issuance or predetermined chip consumption by the user may be further recorded and managed, in order that chip issuance conditions or chip consumption conditions can be calculated from the record of such predetermined chip issuance or consumption histories. Additionally, such chip issuance conditions or chip consumption conditions may be calculated as common conditions for all users, or as personal conditions for each user.

The above explained structure of this invention can be further extended in such a way that electronic chips are issued based on electronic chip issuance conditions in response to the user operation of a game, and an advertisement which is related to the game operation is displayed as the response of the operation by the user.

Through the invention described here, a user can play a network game such as bingo by using a game client terminal placed in a shop after shopping or enjoying pinball game and acquire electronic chips according to the score of the network game. The user can afterwards order various kinds of commodities using a Web-POS(point of sales) client terminal placed in that shop or in another shop, and can receive discount by using electronic chips issued for the user. Electronic chips can thus be effectively used for sales promotion according to this invention.

The exchange rate for the electronic chip issuance, or the exchange rate from the game score to the electronic chips as a more specific example, and the exchange rate for the electronic chip consumption, or the exchange rate from the electronic chips to the currency at purchasing commodities as a more specific example, can be dynamically changed according to various conditions by using the electronic chip circulation server apparatus of this invention.

Accordingly, various kinds of effective sales promotion means can be generated such aggressive sales promotion to long time subscribers or to users who make frequent access, sales promotion enforcement for infrequently accessed games, sales promotion support to shops recording poor sales results, or consumption acceleration for electronic chips which have a short remnant valid period.

Also, user researches. based on the contents of an operation record management module become possible by applying this invention.

Furthermore, various applications can become possible by applying this invention. For example, a subscriber can receive electronic chips as the result of playing a game or applying for a quiz or a questionnaire through the Internet from his/her PC, with advertisement displays on the PC related to sponsors of such games, quizzes or questionnaires. In this case, the subscriber becomes willing to play a game or applying a quiz or a questionnaire expecting for electronic chip acquirement, and the subscriber automatically see the advertisement pages on the browsing screen of the PC, thus generating large sales promotion effects.

DESCRIPTION OF DRAWINGS

FIG. 2 depicts the data structure in an electronic chip issuance condition database which is managed by an electronic chip issuance condition calculation module in the first embodiment of the invention.

FIG. 3 is the data structure in a database which is managed by an electronic chip record management module in the first embodiment of the invention.

FIG. 4 explains a display example for a game client terminal in the first embodiment of the invention.

FIG. 5 shows a display example for a Web-POS client terminal in the first embodiment of the invention.

FIG. 6 is the data structure in an electronic chip consumption condition database which is managed by the electronic chip condition calculation module in the first embodiment of the invention.

FIG. 7 is the data structure in a game record database which is managed by an operation record management module in the first embodiment of the invention.

FIG. 8 describes the data structure in a sales record database which is managed by the operation record management module in the first embodiment of the invention.

FIG. 9 shows the data structure in a user record database which is managed by the operation record management module in the first embodiment of the invention.

FIG. 10 is the configuration of the second embodiment for the electronic chip circulating system of this invention and FIG. 11 is the data structure in an electronic chip issuance condition database which is managed by an electronic chip issuance condition management server in the second embodiment of this invention.

DESCRIPTION OF THE PREFERRED EMBODIMENT

Each preferred embodiment of the invention will be explained hereinafter referring to drawings.

The Fist Embodiment of the Invention

By applying the first embodiment of the invention, a user can play a network game such as Bingo using a game client terminal in a shop, after he or she enjoys purchasing commodities or playing pinball game. The user can receive electronic chips according to the score of the network game. The operation of such a network game may be sponsored by a commodity vendor or by a shopping arcade in which the shop is located. After receiving electronic chips, the user may go and access to a Web-POS terminal which is placed either in the same shop or in another, make orders for purchasing various commodities and receive discount by using already acquired electronic chips. Ordered commodities may be received at another shop in the shopping arcade, or delivered directly to the user's home.

One outstanding feature of this invention is that the exchange rate from the game score to the electronic chips and the exchange rate from electronic chips to the currency at the purchase can be dynamically altered according to various conditions, by using the electronic chip circulation server apparatus. Consequently, it becomes possible to generate easily various kinds of effective business promotion means. For example, the exchange rate of electronic chips from the game score may be set higher than usual for users who come to the store and access to the network game frequently. Or, the exchange rate of electronic chips to the currency may be set higher than usual for a store where the purchase orders for commodities by users in general is poor.

Figure 1:
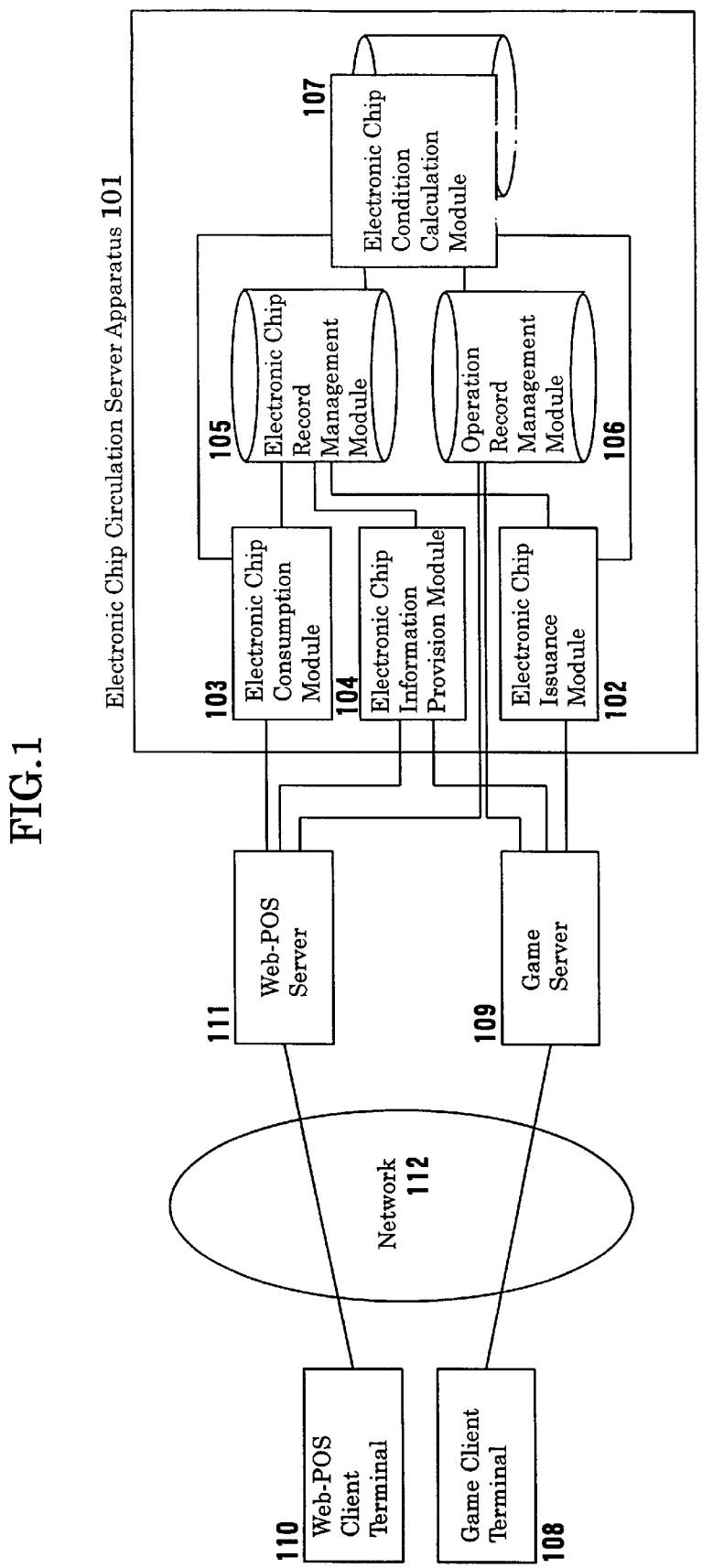
FIG. 1 shows the configuration of the first embodiment for the electronic chip circulating system of this invention.

FIG. 1 shows the configuration of the first embodiment for the electronic chip circulation system of this invention. A user plays a network game by operating game client terminal 108. Game server 109 manages game client terminal 108 that is operated by the user, to execute the network game program, through network 112 which is actually the Internet or a leased line network. Game server 109 notifies the game category played by the user, the score of the game and the user ID to electronic chip issuance module 102 in electronic chip circulation server apparatus 101. This notification is carried out by using an Internet mail, for example.

Operation modes of a network game which is realized by game client terminal 108 and game server 109 are exemplified in detail in Japanese Patent Application Document No. 1997-24009 by the same applicant. When one of such operation modes of a network game is applied, the user ID is authenticated for the game player before playing the game, allowing access to the same game once a day, for example, during a long valid period which is predetermined. This makes it possible for the user to continue enjoying one game for a long period. So, if this kind of network games is applied to a service event of a shop, it becomes possible for the shop to hold established users who intend to come and play the game every once a day at the shop, thus generating a strong sales promotion effect. Also, another effect is that it becomes possible to make users come to the shop at least once during a predetermined period, because the game valid period is set to the desired limited period. Since a POS terminal can be used as the game terminal, no special dedicated equipment for playing the game is required. This enables even for small shops to attract more users at a low cost.

The first embodiment of the invention realizes further effective sales promotion by adding electronic chip issuing functions to such a conventional network game system.

Electronic chip circulation server apparatus 101 in FIG. 1 is a computer which manages the circulation and the exchange rate of electronic chips. Electronic chip issuance module 102 issues electronic chips according to the user operation through game client terminal 108 and game server 109, based on predetermined issuance conditions.

Conditions for electronic chip issuance are kept in an electronic chip issuance condition database which is managed by electronic chip condition calculation module 107. FIG. 2 shows the data structure of the electronic chip issuance condition database. The exchange rate and the valid period calculated by electronic condition calculation module 107 are stored as the record corresponding to each combination of the user ID and the game category in the table of the database.

Electronic chip issuance module 102 searches records in the electronic chip issuance condition database by the game category, the game score and the user ID those are notified from game server 109, and extracts corresponding. exchange rate and valid period.

Next, electronic chip issuance module 102 calculates the chip amount value to be issued by multiplying said exchange rate and the game score notified by game server 109. Then said module 102 records the derived chip amount value in a database which is managed by electronic chip record management module 105.

FIG. 3 shows the data structure of this database. The issued chip amount, the consumed chip amount, the present chip balance and the expired chip amount are stored as each record corresponding to each combination of the user ID and the valid period. Electronic chip issuance module 102 stores the amount of issued chips that is calculated by the module, as the record corresponding to the user ID and the valid period. This user ID is informed by game server 109, and the valid period is derived from the electronic chip issuance condition database (FIG. 2) that is managed by electronic chip condition calculation module 107.

If there are no records corresponding to the ID-valid period combination, then a new record is registered. If there exists one, the newly issued chip amount is added to the current issued chip amount and to the current chip balance of the record, respectively.

Electronic chip issuance module 102 periodically transmits all of the record contents of said electronic chip issuance condition database to game server 109. This transmission is carried out through electronic mails, for example. Also, electronic chip information provision module 104 periodically transmits all of the record contents of the database (FIG. 3) that is managed by electronic chip record management module 105, to game server 109. This transmission is also carried out through electronic mails, for example.

Game server 109 embeds information including the exchange rate, the valid period and the current chip balance those are informed from electronic chip issuance module 102 and from electronic chip information provision module 104, into HTML (Hyper Text Markup Language) game form data which are to be transmitted to game client terminal 108. This embedding is done for each user ID and for each game category, and by using Java script language developed by Netscape Communications Corporation, for example. Here, the current chip balance means the current sum of all chips having the same user ID as the player of the game client terminal 108 and having the valid period,. among all records in the database (FIG. 3) that is managed by electric chip record module 105.

A user plays a game using a game form display as shown in FIG. 4, for example, on game client terminal 108. Not only the. game display itself, but also such data as "Score of the Game", "Present Exchange Rate", "Acquired Chips by this Play", "Valid Period" and "Present Total Chip Amount" are displayed on the screen of the game form display. In fields of "Present Exchange Rate" and "Valid Period", the exchange rate and the valid period those are transmitted from game server 109 are displayed respectively. When "Score of the Game" is revised as the game goes on, the value in the field of "Acquired Chips by this Play" is automatically renewed as the result of the calculation using the present exchange rate that is transmitted from game server 109. Also, the "Present Total Chip Amount" value is automatically calculated by adding the "Acquired Chips by this Play" to the present chip balance value that is transmitted from game server 109. These automatic calculations and displays are carried out as the action of game client terminal 108 to execute calculation cords written by Java script language embedded in the HTML game form data.

As described above, the user can acknowledge such data as his or her acquired chips by playing the game, the valid period for chips, present exchange rate or present total chip amount, while continuing the present network game.

After playing the game, the user can order commodities in a shop of the network shopping mall or in an actual shop in an arcade of the region, by using Web-POS client 110 placed in the shop where the user is playing the game, or by using Web-POS client 110 realized on his or her personal computer at home.

Management of the point of sales information which is necessary to enable such operation is carried out by Web-POS server 111 that is connected to the Web-POS client terminal through network 112, as shown in FIG. 1.

Technology for the management of POS (point of sales) information using Web-POS client terminal 110 and Web-POS server 111 is disclosed in the Japanese Patent Application Document No. 1991-3546 by the same applicant.

The disclosed system in the above mentioned patent application is characterized as POS functions are realized on a Web-server/Web-client system based on the communication using HTTP (Hyper Text Transfer Protocol). By using this system, it becomes possible not only to realize a low cost POS system, but also to connect a server and client terminals using public communication networks such as the Internet or using a local area network (LAN), without installing dedicated communication lines for the POS service.

Additionally, since the proposed Web-server/client system is one of such systems as can realize opening and browsing home pages like in the wide-spread Internet, it can be easily realized by utilizing a conventional workstation and personal computers. Hence, it becomes possible to transmit information stored in the server, such as sales results or sales orders of each client, to the supplier of each commodity by using an electronic mail or HTTP communication.

Such a flexible Web-POS client-server system explained heretofore is applied to the embodiment of this invention. That is, the electronic chip information is transmitted to Web POS server 111 from electronic chip consumption module 103 and electronic chip information provision module 104 in electronic chip distribution server 101, or inversely the electronic chip consumption information is transmitted from Web POS derver 111 to electronic chip consumption module 103 in electronic chip circulation server apparatus 101, by using transmission means such as electronic mails.

FIG. 5 shows a form display example that is displayed on POS client terminal 110. A user selects the desired commodity category from the category list in the first frame and the desired commodity name from the price look-up list (PLU) for the selected commodity category in the second frame. Then the user inputs the desired quantity of the commodity into the quantity input field of the displayed second frame, by using a keyboard. Through these procedures a detailed form for POS management can be created automatically.

At the same time, total price amount for purchased commodities listed in "Ordered Commodity Details" lines is automatically calculated and displayed as "Ordered Commodity Price". Other items, such as the valid period for chips, "Valid period", the present balance of chips, "Present Balance", and the exchange rate for chips, "Exchange Rate" are also displayed. When the user inputs for each valid period the desired quantity of chips to consume by this order into the "Used Chips" field, each quantity number is multiplied by the exchange rate to get the equivalent discount value displayed as "Used Chip Equivalent". Consequently, the value of "Sub Total" is calculated as the result of subtracting the "Used Chip Equivalent" field value for each valid period from the "Ordered Commodity Price" field value. The value of the tax for this purchase is calculated automatically as "Tax", and finally the value of "Total Order Value" is obtained.

These series of calculations and displays are executed as the operation of Web-POS client terminal 110, carrying out calculation codes written in Java Script language and embedded in Web POS form data. Actual management and control of the system to carry out such operation is realized by using the software management and control technology that is revealed by said Japanese Patent Application Document No. 1991-3546.

Electronic chip consumption module 103 in FIG. 1 transmits periodically at a predetermined interval, client IDs, valid periods and the exchange rate in all records of an the electronic chip condition calculation database to Web-POS server 111. This electronic chip condition calculation database is controlled and managed by electronic chip condition calculation module 107 and has the data structure shown in FIG. 6. This data transmission is carried out using electronic mails, for example. Client IDs are codes to identify each Web-POS client terminal 110, and the exchange rate is the information to show the currency value per unit electronic chip.

As explained above, the exchange rate can be determined independently by each shop where each Web-POS client terminal 110 is placed.

Electronic chip information provision module 104 in FIG. 1 transmits periodically at a predetermined interval, all records in the database that is managed and controlled by electronic chip record management module 105, to Web-POS server 111. This data transmission is carried out using electronic mails, for example, also.

Web-POS server 111 embeds such data as each valid period, each chip balance and each chip exchange rate for each client ID of Web-POS client terminal 110 and for each user who operates the terminal, into HTML Web-POS form data to be sent to Web-POS client terminal 110, by using Java Script language or the like. Such data are notified to Web-POS server 111 from electronic chip consumption module 103 and from electronic chip information provision module 104, as explained above. Hence, the Web-POS form as shown in FIG. 5 can be displayed on the screen of Web-POS client terminal 110, and the user can use his/her own electronic chips as he/she wants.

When the user pushes the "Order" button on the form screen, point-of-sales information including electronic chip consumption quantity are transmitted from Web-POS client terminal 110 to Web-POS server 111 as form data.

Web-POS server 111 resisters this point-of-sales information into an internal database, and informs the user ID, each electronic chip valid period and consumption amount for each valid period, to electronic chip consumption module 103 in electronic chip circulation server apparatus 101, by using an electronic mail, for example.

Electronic chip consumption module 103 then adds the electronic chip consumption amount for each valid period notified from Web-POS server 111 onto the "Consumed Chip Amount" field of each record corresponding to the user ID and the valid period notified also from Web-POS server 111. The corrected chip balance is updated according to the result of this addition.

Meanwhile, game server 109 transmits periodically, the interval, the user ID and the access count for each game category for the user, to operation record management module 106 in electronic chip circulation server apparatus 101, through an electronic mail for example. Operation record management module 106 then registers the information to a game record database having the data structure shown in FIG. 7 for example.

Web-POS server 111 transmits periodically, the interval and the total sales for each user to operation record management module 106 in electronic chip circulation server apparatus 101, through an electronic mail for example. Operation record management module 106 then registers the information to a sales record database having the data structure shown in FIG. 8 for example.

Figure 9:
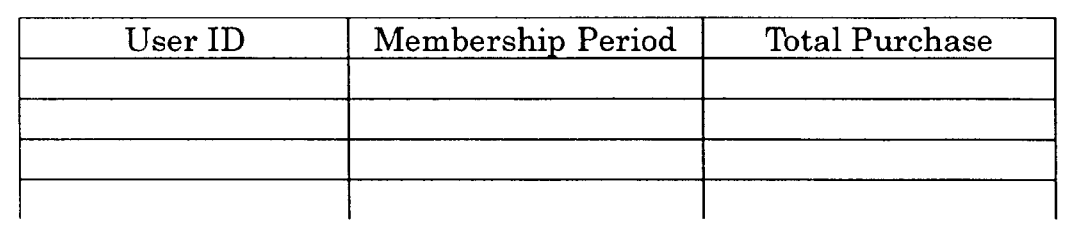

Additionally, operation record management module 106 registers the membership period and the total sales for each user ID to a user record database having the data structure shown in FIG. 9 for example.

Electronic chip condition calculation module 107 updates contents of the electronic chip issuance condition database having the data structure shown in FIG. 2 for example, and contents of the electronic chip consumption database having the data structure shown in FIG. 3 for example. These updates are carried out according to contents of the game record database, the sales record database and the user record database which are managed by said operation record management module 106, and according to contents of the database that is managed by electronic chip circulation server apparatus 101 and that has the data structure shown in FIG. 3 for example.

Figure 7:
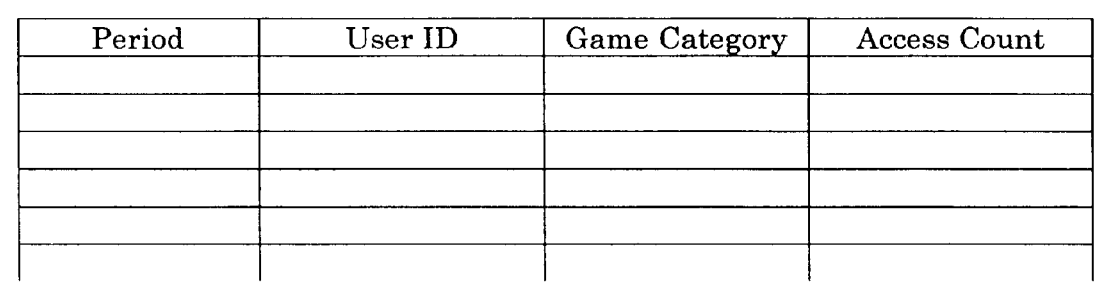

More specifically, electronic chip condition calculation module 107 updates contents of the electronic chip Issuance condition database shown in FIG. 2, so that the exchange rate is changed according to a predetermined function that varies with the access count number for each user ID that is given in the game record database shown in FIG. 7 for example, or that varies with the change of the access count for each user ID in reference to the length of the membership period.

Otherwise, electronic chip condition calculation module 107 updates the content of the electronic chip issuance condition database shown in FIG. 2, so that the exchange rate is increased according to a predetermined function for a game category having a smaller access count number as shown in the game record database shown in FIG. 7 for example, or for a game category having a larger decreasing rate for game access count number as the time passes.

Otherwise, electronic chip condition calculation module 107 updates the exchange rate in the electronic chip issuance condition database shown in FIG. 2, so that the exchange rate is increased according to a predetermined function for a user ID with a longer membership period as given in FIG. 9 for example, or for a user ID with a larger total sales.

Figure 6:
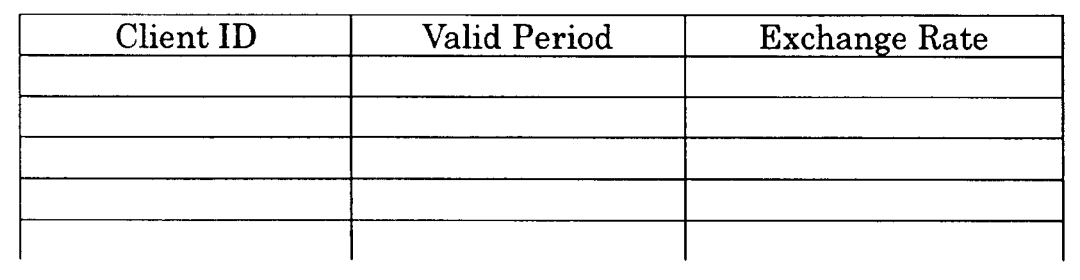
Figure 8:
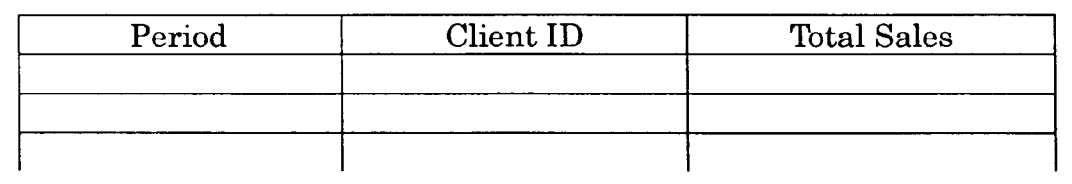

Also, electronic chip condition calculation module 107 updates the exchange rate in the electronic chip consumption condition database shown in FIG. 6, so that the exchange rate is increased according to a predetermined function for a client ID having a lower total sales as shown in the sales record database shown in FIG. 8 for example, or for a client ID having a larger decreasing rate for total sales as the time passes.

Additionally, electronic chip condition calculation module 107 updates contents of the electronic chip consumption condition database shown in FIG. 6, so that the exchange rate is decreased for a record having a shorter valid period.

As described above, the exchange rate from game scores to electronic chips and the exchange rate from electronic chips to the currency at purchasing commodities can be dynamically changed according to various conditions, by electronic chip condition calculating module 107 in electronic chip circulation server apparatus 101.

Consequently, various kinds of sales promotion effects can be easily generated, such as further sales promotion to users who have long membership or make frequent access, in crease in access count for such games recording infrequent access, sales promotion for stores recording poor sales, or acceleration of consumption for electronic chips having a short remnant valid period.

In the first embodiment of this invention, all of the information transmission exemplified in the following can be carried out through electronic mails on the Internet, as explained already for some cases. Those examples include transmission of game category and game score information from game server 109 to electronic chip circulation server apparatus 101, transmission of electronic chip issuance conditions from electronic chip issuance module 102 to game server 109, transmission of contents of electronic chip record management module 105 from electronic chip information provision module 104 to game server 109 and to Web-POS server 111, transmission of electronic chip consumption conditions from electronic chip consumption module 103 to Web-POS server 11 and transmission of such information as the user ID or the electronic chip consumption count from Web-POS server 111 to electronic consumption module 103.

In using the electronic mail transmission, the destination module where the information in the electronic mail is to be forwarded can be assigned and controlled by using the contents of the address field of "T0:" of the electronic mail. Other information to be transmitted such as explained above can also be notified by using specified format in the electronic mail. By using electronic mails for such information transmission, connections between various servers in the system through simple control become possible. Also, the transmission system maintenance becomes easy because a human understandable electronic mail command set is used for the system.

In the first embodiment of the invention, electronic chips are issued when a game is played on the system between game client terminal 108 and game server 109, and electronic chips are consumed when a commodity is ordered and sold on the system between Web-POS client terminal 110 and Web-POS server 111.

The intention of this invention, however, is not limited to such a case, but can be extended to other cases where various kinds of server are connected to client terminals for the purpose of chip issuance and consumption. For example, in the first embodiment of the invention, electronic chips can be issued when a commodity is purchased on the system between Web-POS client terminal 110 and Web-POS server 111, instead of when a game is played on the system between game client terminal 108 and game server 109.

Calculation of electronic chip issuance conditions and electronic chip consumption conditions by electronic chip condition calculation module 107 is not only based on parameters those are specified in the first embodiment of the invention, but it can be based on various items which are managed by electronic chip record management module 105 and operation record management module 106.

The Second Embodiment of the Invention

Figure 10:
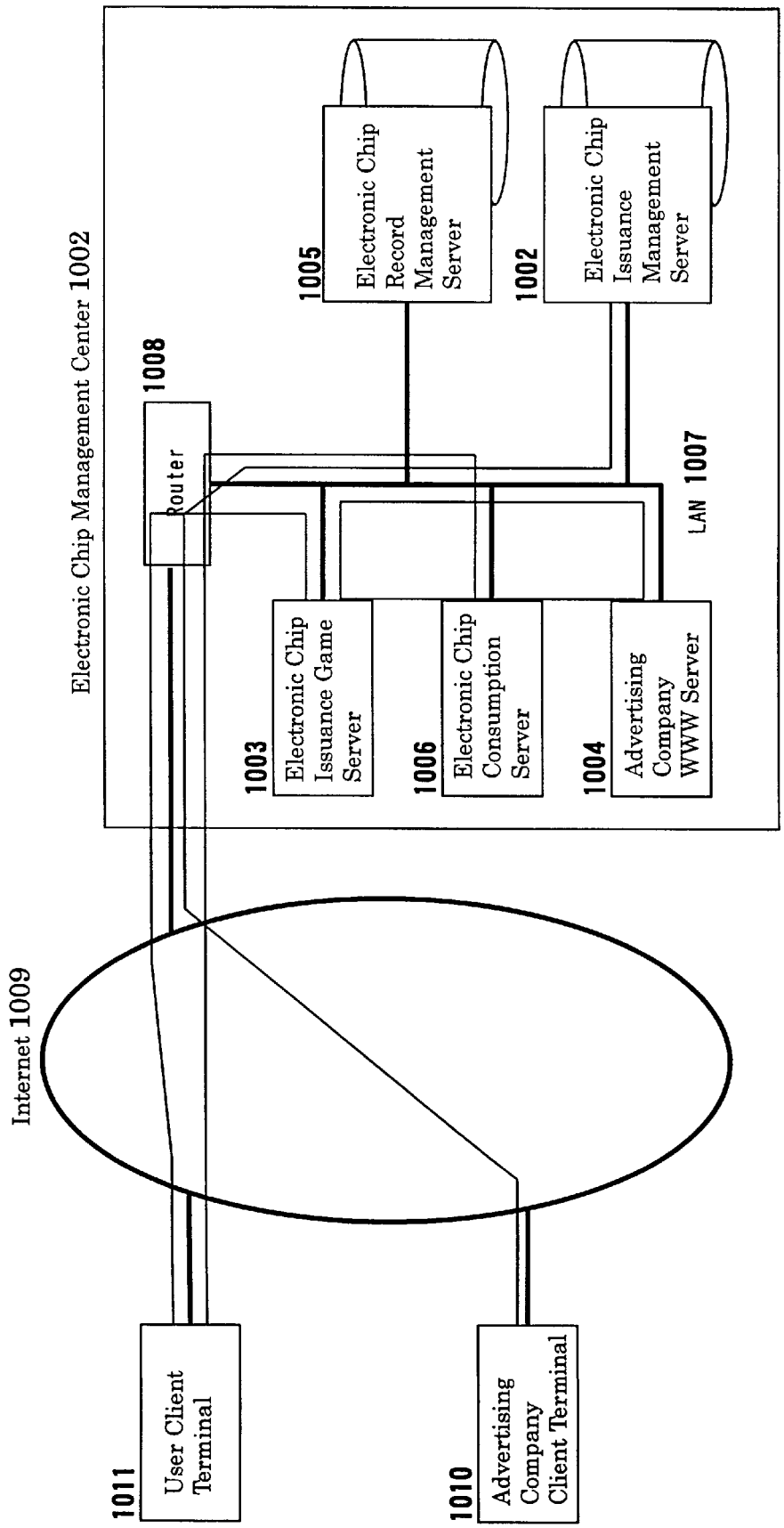

The second embodiment of the invention makes it possible to provide with effective advertisement to wide range of users, in addition to features of the first embodiment of the invention. FIG. 10 shows the second embodiment structure of the electronic chip circulation system of this invention.

Whereas one electronic chip circulation server apparatus 101 controls all of the circulation of electronic chips in the first embodiment of the invention, the whole electronic chip circulation is controlled by many servers which work together in cooperation, in the second embodiment of the invention. Such servers are electronic chip issuance management server 1002 that is connected to LAN 1007 in electronic chip management center 1001, electronic chip issuance game server 1003, advertising company WWW server 1004, electronic chip record management server 1005 and electronic chip consumption server 1006. Here, LAN 1007 is connected to the Internet 1009 through router 1008.

Electronic chip issuance management server 1002 has similar functions as electronic chip issuance condition calculation module 107 of the first embodiment of the invention in FIG. 1. A company which wants to make advertisement first accesses to the electronic chip request home page that is provided by electronic chip issuance management server 1002, from advertising company client terminal 1010 that is connected to the Internet 1009. Advertising company client terminal 1010 is an ordinary personal computer which is connected to the Internet and a browsing tool is installed in. When an operator of the client terminal inputs URL data requesting for the home page mentioned above on the browser display on the screen, those URL data are sent to electronic chip issuance management server 1002, via the Internet 1009, router 1008 and LAN 1007.

A WWW server program is working. on electronic chip issuance management server 1002. This program first responds to URL data entered from advertising company client terminal 1010 onto the electronic chip request home page, and sends back log-in form data written by Hyper Text Transfer Protocol (HTTP) messages to advertising company client terminal 1010 so that the operator can input the company ID and the password.

The operator of advertising company client terminal 1010, who is actually responsible for operating the terminal for the purpose of advertising, enters the company ID and the password onto the log-in form on the browsing display, and then clicks the "Submit" button that is also displayed on the form. Consequently, form data including entered company ID and the password are transmitted from advertising company client terminal 1010 to electronic chip issuance management server 1002, via the Internet 1009, router 1008 and LAN 1007.

Electronic chip issuance management server 1002 authenticates the company ID and the password by referring its company user authentication file which is not shown in figures though. After the authentication, the server sends electronic chip application form data written by HTTP messages, such electronic chip related data as the game category, the chip upper limit, the exchange rate, and the valid period, to advertising company client terminal 1010.

The operator of advertising company client terminal 1010 enters such necessary items into the electronic chip application form on the browsing display, and then clicks the "Submit" button on the form by using a mouse. Consequently, form data including such necessary items mentioned above are transmitted from advertising company client terminal 1010 to electronic chip issuance management server 1002, via the Internet 1009, router 1008 and LAN 1007.

Next, electronic chip issuance management server 1002 creates and adds a new record to the electronic chip issuance condition database having the data structure shown in FIG. 11. The server then writes the authenticated company ID into the company ID field of that record, extracts such data as the game category, the chip upper limit, the exchange rate and the valid period from received electronic chip application form data, and writes such data into the corresponding field of the new record, respectively.

Ordinary users access to various kinds of game home pages, quiz home pages or questionnaire home pages (these home pages will be expressed en bloc as amusement home pages, hereafter) which are provided by electronic chip issuance game server 1003, through user client terminal 1011 connected to the Internet 1009. User client terminal 1011 is an ordinary personal computer just similar to advertising company client terminal 1010. When an operator of user client terminal 1011 (will be denoted as an ordinary user, hereafter) enters the URL for one of said amusement home pages on the browsing screen, URL data requesting for that home page is sent to electronic chip issuance game server 1003 through the Internet 1009, router 1008 and LAN 1007.

Electronic chip issuance game server 1003 has functions of game server 109 in FIG. 1 of the first embodiment of this invention, electronic chip issuance module 102 in electronic chip distribution server 102 of electronic chip distribution server 101, and if necessary, electronic chip information provision module 104 in electronic chip information distribution server 101.

A WWW server program is working on electronic chip issuance game server 1003. This program first responds to URL data of the amusement home page entered from user client terminal 1011, and transmits such data as game form data, quiz form data or questionnaire form data (such data will be denoted en bloc as amusement form data, hereafter) to user client terminal 1011.

An ordinary user, after enjoying a game or a quiz, or responding to a questionnaire using an amusement form, clicks the "Submit" button that is displayed on that amusement form by using a mouse. Consequently, form data including game, quiz or questionnaire response are transmitted from user client terminal 1011 to electronic chip issuance game server 1003 via the Internet 1009, router 1008 and LAN 1007.

Electronic chip issuance game server 1003 extracts the company ID, the game category, the response to the game, quiz or questionnaire and the client ID from received form data. Electronic chip issuance game server 1003 then requests for the exchange rate and the chip valid period to electronic chip issuance management server 1002 that is connected to server 1003 through LAN 1002, according to the company ID and the game category. This request can be made by an electric mail, for example. Electronic chip issuance management server 1002 then searches the electronic chip issuance condition database that has the data structure shown in FIG. 11, by using the company ID and the game category as search keys, in order to get the exchange rate and the valid period. The server then sends acquired these data back to electronic chip issuance game server 1003, by using an electronic mail, for example. It is possible to configure the system as electronic chip issuance game server 1003 directly accesses to the electronic chip issuance condition database that is managed by electronic chip issuance management server 1002, in order to acquire the exchange rate and the valid period.

Next, electronic chip issuance game server 1003 calculates issued chip amount from the response to the game, quiz or questionnaire (such as the right answer, the wrong answer or the score) and the exchange rate. Electronic chip issuance game server 1003 then transmits the calculated issued chip amount to electronic chip issuance management server 1002, together with the company ID and the game category. Electronic chip issuance management server 1002 searches records in the electronic chip issuance condition database of which data structure is shown in FIG. 11, using the company ID and the game category as search keys. Electronic chip issuance management server 1002 adds the issued chip amount that is received from electronic chip issuance game server 1003 onto the issued chip amount field of the searched record, and renews the contents of the issued chip amount field to that accumulation result. It is possible to configure the system as electronic chip issuance game server 1003 directly accesses to the electronic chip issuance condition database that is managed by electronic chip issuance management server 1002, in order to renew the issued chip amount.

Next, electronic chip issuance game server 1003 transmits the issued chip amount calculated and the valid period that is obtained from electronic chip issuance management server 1002 to electronic chip record management server 1005, together with the user ID that is obtained from said amusement form data. Electronic chip record management server 1005 has the same functions as electronic chip record management module 105 in the first embodiment of the invention shown in FIG. 1 has. Server 1005 manages a database which is similar to the database shown in FIG. 3 and managed by electronic chip record management module 105, together with the management of general user information such as user names and addresses. Electronic chip record management server 1005 searches for a record corresponding to search keys of the user ID and the valid period which are received from electric chip issuance game server 1003, and adds the issued chip amount received from chip issuance game server 1003 onto the chip issuance number that is recorded in the chip issuance field of the searched record. The content of the chip issuance number field is replaced by the accumulated value of issued chip amount obtained by this addition. A different structure where electric chip issuance game server 1003 directly access to the database that is managed by electronic chip record management server 1005 to renew the issued chip amount may be also applied.

As explained above, an ordinary user can receive electronic chips by playing a game, or responding to a quiz or a questionnaire which is related to a specific advertising company.

Electronic chip issuance game server 1003 finally generates an order to display the home page that corresponds to the company ID and the game category in the form data received from user client terminal 1011. The order is then transmitted to advertising company WWW server 1004 that is connected to the Internet 1007. Advertising company WWW need not always be connected to LAN 1007, but it can be connected to a LAN of the advertising company connected to the Internet 1009. The order is a kind of server redirection orders written as HTTP messages, consisting of a character string of "Location" and corresponding URL data in advertising company WWW server 1004.

The result of the game, or the response to the quiz or questionnaire enjoyed by the ordinary user through the amusement home page are displayed on the home page that is received from said advertising company WWW server 1004. The ordinary user can see and confirm such results on the home page. Advertisement of the advertising company is also displayed at the same time on the home page that is received from advertising company WWW server 1004.

This means that the ordinary user inevitably see the advertisement home page of the advertising company when he or she responds to a game, a quiz or a questionnaire, and as a return of it, he/she gets electronic chips. Since the ordinary user is likely to respond positively to a game, a quiz or a questionnaire expecting to get electronic chips, and. since the advertisement of the advertising company always appear on the user's browsing screen, large sales promotion effects can be expected.

Electronic chip consumption server 1006 contains functions of Web-POS server 111, and functions of electronic chip consumption module 103 and electronic chip information provision module 104 both of those are in electronic chip circulation server apparatus 101, and realizes just same electronic chip consumption functions as the first embodiment of the invention realizes by using components of 111, 103 and 104.

Electronic chip issuance management server 1002 manages a database which is similar to the database that electronic chip condition calculation module 107 of the first embodiment of the invention shown in FIG. 1 manages and that has the data structure shown in FIG. 6. Electronic chip consumption server 1006 transmits the client ID that corresponds to the specific shop in the shopping area, by using an electronic mail for example, to electronic chip issuance management server 1002, in order to request the valid period and the exchange rate which correspond to that client ID.

Electronic chip issuance management server 1002 then searches the electronic chip consumption condition database that has the data structure shown in FIG.6 by using the client ID as the search key, gets the valid period and the exchange rate and send back these data to electronic chip consumption server 1006, by using an electronic mail, for example. The valid period and the exchange rate for each client ID (shop) in the chip consumption database are predetermined by an administrator of electronic chip management center 1001. Here, the exchange rate is the information showing the currency value per unit electronic chip, just the same as in the case of the first embodiment of the invention.

Electronic chip consumption server 1006 gets periodically at a predetermined interval the whole recorded contents of the database (FIG. 3) that is managed by electronic chip record management server 1005. This is done also by using electronic mails, for example.

Electric chip consumption server 1006 then embeds information such as the valid period of electronic chips, the current chip balance, the exchange rate, etc. corresponding to the user ID that is entered in advance from user client terminal 1011, into HTML based Web-POS form data to be sent to user client terminal 1011, by using Java Script language.

Consequently, an ordinary user can display a Web-POS form which is shown in FIG. 5 and which is provided by electronic chip consumption server 1006 as explained for the first embodiment of the invention, by using user client terminal 1011 that is connected to the Internet 1009. The user thus becomes possible to use his/her electronic chips as he or she desires.

When the ordinary user pushes the "Order" button or the like on the form display after he or she enters commodity purchasing information onto the form display, form data of point-of-sales information including electronic chip consumption information is sent from user client terminal 1011 to electronic chip consumption server 1006.

Electronic chip consumption server 1006 registers this point-of-sales information into an internal database, and informs the user ID, the electronic chip valid period and associated chip consumption quantity for each valid period, to electronic chip record management server 1005, by using an electronic mail for example.

Electronic chip record management server 1005 then adds the electronic chip consumption amount for each valid period notified from electronic chip consumption server 1006 onto the "Consumed Chip Amount" field (as shown in FIG. 3) of each record corresponding to the user ID and the valid period notified also from electronic chip consumption server 1006. The current chip balance in the corresponding record is updated according to the result of this addition.

Electronic chip consumption server 1006 can be configured in a different way, wherein electronic chip consumption server 1006 displays a form picture on which an ordinary user can select a gift according to the current electronic chip balance.

When an ordinary user pushes the "Order" button or the like after he or she selects an available gift on the form picture, the gift selection information including the electronic chip consumption amount is transmitted from user client terminal 1011 to electronic chip consumption server 1006, as form data.

Electronic chip consumption server 1006 stores the gift selection information in a database for delivery preparation, and transmits the user ID, each electronic chip valid period and the chip consumption information for each valid period to electronic chip record management server 1005, by using an electronic mail for example.

Electronic chip record management server 1005 then adds the electronic chip consumption amount for each valid period notified from electronic chip consumption server 1006 onto the "Consumed Chip Amount" field (see FIG. 3) of the record that corresponds to the user ID and the valid period notified also from electronic chip consumption server 1006. The current chip balance in the corresponding record is updated according to the result of this addition.

Furthermore, another configuration can be adopted to apply the second embodiment of the invention, wherein another electronic chip circulation system which has the same configuration as shown in FIG. 1 for the first embodiment of the invention is used instead of electronic chip consumption server 1006. In this case, an ordinary user, with electronic chips as his or her funds, plays at a virtual casino or plays a fighting game by using game client terminal 108 and game server 109. If the user acquires additional electronic chips, such chips can be consumed by using Web-POS server 111 and Web-POS client terminal 110.

What is claimed is:

1. An electronic chip circulation method for circulating electronic chips including procedures of (a) issuing electronic chips in response to predetermined issuance operation by a user according to predetermined electronic chip issuance conditions, (b) accepting electronic chip consumption in response to a predetermined consumption operation by said user according to predetermined electronic chip consumption conditions, (c) providing said user with information related to electronic chips which said user possess as electronic chip information, (d) managing issuance records of said electronic chips and consumption records of said electronic chips and (e) calculating said electronic chip issuance conditions and said electronic chip consumption conditions according to said electronic chip issuance records and said electronic chip consumption records.

2. An electronic chip circulation method as claimed in claim 1, wherein procedures of (a) managing records of said predetermined issuance operation by said user and records of said predetermined consumption operation by said user and (b) calculating said electronic chip issuance conditions and said electronic chip consumption conditions according to managed contents of records for said predetermined issuance operation by said user and said predetermined consumption operation by said user, are further included.

3. An electronic chip circulation method as claimed in claim 1, wherein said electronic chip consumption conditions include (a) an exchange rate between the unit of said electronic chips and the unit of currency and (b) a valid period of said electronic chips.

4. An electronic chip circulation method as claimed in claim 1, wherein said method includes a procedure to calculate said electronic chip issuance conditions or said electronic chip consumption conditions which are set to common to all of said users.

5. An electronic chip circulation method as claimed in claim 1, wherein said method includes a procedure to calculate said electronic chip issuance conditions or said electronic chip consumption conditions for each of said user, respectively.

6. An electronic chip circulation method as claimed in claim 1, wherein said method includes a procedure to issue said electronic chips in response to a game operation of said user, according to said electronic chip issuance conditions.

7. An electronic chip circulation method as claimed in claim 6, wherein said electronic issuance conditions include (a) an exchange rate between the score of said game operation and the unit of said electronic chips and (b) a valid period for said electronic chips.

8. An electronic chip circulation method as claimed in claim 1, wherein said method includes a procedure to issue said electronic chips in response to an operation of a user to purchase commodities, according to said electronic chip issuance conditions.

9. An electronic chip circulation method as claimed in claim 1, wherein said method includes a procedure to accept consumption of said electronic chips in response to an operation of a user to purchase commodities, according to said electronic chip consumption conditions.

10. An electronic chip circulation method as claimed in claim 1, wherein said method includes a procedure to accept consumption of said electronic chips in response to game operation of a user, according to said electronic chip consumption conditions.

11. An electronic chip circulation method as claimed in claim 1, wherein said method includes procedures (a) to issue said electronic chips in response to game operation of a user according to said electronic chip issuance conditions and further (b) to display advertisement which is connected to said game operation of said user, as a response to a game operation of said user.

12. An electronic chip circulation server apparatus for circulating electronic chips, wherein said apparatus contains (a) an electronic chip issuance module which issues electronic chips in response to predetermined electronic chip issuance operation by a user according to predetermined electronic chip issuance conditions, (b) an electronic chip consumption module which accepts consumption of said electronic chips in response to predetermined consumption operation by said user according to predetermined electronic chip consumption conditions, (c) an electronic chip information provision module which provides said user with information related to electronic chips which said user possess as electronic chip information, (d) an electronic chip record management module which manages issuance records of said electronic chips by said electronic chip issuance module and consumption records of said electronic chips by said electronic chip consumption module and (e) an electronic chip condition calculation module which calculates said electronic chip issuance conditions and said electronic chip consumption conditions according to the managed contents of said electronic chip record management module.

13. An electronic chip circulation server apparatus as claimed in claim 12, wherein said apparatus contains further an operation record management module which manages records of said predetermined issuance operation and said predetermined consumption operation by said user, and said electronic chip condition calculation module calculates said electronic chip issuance conditions and said electronic chip consumption conditions according to managed contents of said electronic chip record management module and said operation record management module.

14. An electronic chip circulation server apparatus as claimed in claim 12, wherein said electronic chip consumption conditions include (a) an exchange rate between the unit of said electronic chips and the unit of currency and (b) a valid period of said electronic chips.

15. An electronic chip circulation server apparatus as claimed in claim 12, wherein said electronic chip condition calculation module calculates said electronic chip issuance conditions or said electronic chip consumption conditions which are set to common to all of said users.

16. An electronic chip circulation server apparatus as claimed in claim 12, wherein said electronic chip condition calculation module calculates said electronic chip issuance conditions or said electronic chip consumption conditions for each user, respectively.

17. An electronic chip circulation server apparatus as claimed in claim 12, wherein said electronic chip issuance module issues electronic chips in response to a game operation of said user, according to predetermined electronic chip issuance conditions.

18. An electronic chip circulation server apparatus as claimed in claim 17, wherein said electronic chip issuance conditions include (a) an exchange rate between a score of game operation of said user and the unit of said electronic chips and (b) a valid period for said electronic chips.

19. An electronic chip circulation system which contains an electronic chip circulation server apparatus for circulating electronic chips, wherein said apparatus contains (a) an electronic chip issuance module which issues electronic chips in response to predetermined electronic chip issuance operation by a user according to predetermined electronic chip issuance conditions, (b) an electronic chip consumption module which accepts consumption of said electronic chips in response to predetermined consumption operation by said user according to predetermined electronic chip consumption conditions, (c) an electronic chip information provision module which provides said user with information related to electronic chips which said user possess as electronic chip information, (d) an electronic chip record management module which manages issuance records of said electronic chips by said electronic chip issuance module and consumption records of said electronic chips by said electronic chip consumption module and (e) an electronic chip condition calculation module which calculates said electronic chip issuance conditions and said electronic chip consumption conditions according to the managed contents of said electronic chip record management module, wherein said system contains (a) a game client terminal which carries out a network game and (b) a game server which makes said game client terminal to carry out said network game and informs said electronic chip issuance module at least a score of said network game and information that identifies said user who played said network game, and said electronic chip issuance module in said electronic chip circulation server apparatus issues electronic chips according to (p) the score of said network game that is informed by said server apparatus, (q) information that identifies said user who played said network game and (r) said electronic chip issuance conditions, and said electronic chip information provision module provides, via said game server, said game client terminal with information related to electronic chips which said user who operates said game client terminal possesses, as electronic chip information.

20. An electronic chip circulation system as claimed in claim 19, wherein communication between said electronic chip issuance module and said game server is carried out by using an electronic mail.

21. An electronic chip circulation system as claimed in claim 19, which contains an electronic chip circulation server apparatus, wherein said apparatus contains further an operation record management module which manages records of said predetermined issuance operation and said predetermined consumption operation by said user, and said electronic chip condition calculation module calculates said electronic chip issuance conditions and said electronic chip consumption conditions according to managed contents of said electronic chip record management module and said operation record management module, wherein said system contains (a) a game client terminal which carries out a network game and (b) a game server which makes said game client terminal to carry out said network game and informs said electronic chip issuance module at least a score of said network game and information that identifies said user who played said network game, and said operation record management module acquires operation records of said network game via said game server and manages them.

22. An electronic chip circulation system as claimed in claim 21, wherein communication between said operation record management module and said game server is carded out by using an electronic mail.

23. An electronic chip circulation system which contains an electronic chip circulation server apparatus for circulating electronic chips, wherein said apparatus contains (a) an electronic chip issuance module which issues electronic chips in response to predetermined electronic chip issuance operation by a user according to predetermined electronic chip issuance conditions, (b) an electronic chip consumption module which accepts consumption of said electronic chips in response to predetermined consumption operation by said user according to predetermined electronic chip consumption conditions, (c) an electronic chip information provision module which provides said user with information related to electronic chips which said user possess as electronic chip information, (d) an electronic chip record management module which manages issuance records of said electronic chips by said electronic chip issuance module and consumption records of said electronic chips by said electronic chip consumption module and (e) an electronic chip condition calculation module which calculates said electronic chip issuance conditions and said electronic chip consumption conditions according to the managed contents of said electronic chip record management module, wherein said system further contains (a) a point of sales information client terminal which is used for entering point of sales information including said electronic chip consumption information and (b) a point of sales information server which receives said point of sales information from said point of sales information client terminal, and transmits at least said electronic chip consumption information and information to identify said user who consumed said electronic chips to said electronic chip consumption module, and said electronic chip information provision module provides said point of sales information client terminal via said point of sales information server with information related to electronic chips which are possessed by said user who operates said point of sales client terminal.

24. An electronic chip circulation system as claimed in claim 23, wherein communication between said electronic chip consumption module and said point of sales information server is carried out by using an electronic mail.

25. An electronic chip circulation system as claimed in claim 23, which contains an electronic chip circulation server apparatus, wherein said apparatus contains further an operation record management module which manages records of said predetermined issuance operation and said predetermined consumption operation by said user, and said electronic chip condition calculation module calculates said electronic chip issuance conditions and said electronic chip consumption conditions according to managed contents of said electronic chip record management module and said operation record management module, wherein said operation record management module receives records of said point of sales information via said point of sales information server.

26. An electronic chip circulation system as claimed in claim 25, wherein communication between said operation record management module and said point of sales information server is carried out by using an electronic mail.

27. An electronic chip circulation server apparatus as claimed in claim 12, wherein said electronic chip issuance module issues electronic chips in response to purchasing operation by said user according to predetermined issuance conditions.

28. An electronic chip circulation system for circulating electronic chips, wherein said system contains (a) an electronic chip issuance server which issues electronic chips in response to predetermined issuance operation by a user according to predetermined electronic chip issuance conditions, (b) an electronic chip consumption server which accepts consumption of said electronic chips in response to predetermined consumption operation by said user according to predetermined electronic chip issuance conditions, (c) an electronic chip record management server which manages issuance records of said electronic chips by said electronic chip issuance server and consumption records of said electronic chips by said electronic chip consumption server and (d) an electronic chip issuance management server which manages said conditions for said electronic chip issuance and said conditions for said electronic chip consumption.

29. An electronic chip circulation system as claimed in claim 28, wherein said electronic chip issuance server issues electronic chips in response to a game operation of said user, according to said electronic chip issuance conditions.

30. An electronic chip circulation system as claimed in claim 28, wherein said electronic chip issuance server issues electronic chips in response to a game operation by said user according to said electronic chip issuance conditions, and displays advertisement which is connected to said game operation, as a response to said game operation.

31. A computer readable recording medium in which computer programs are recorded and read out by a computer when said recording medium is used by said computer, in which computer programs to make said computer carry out such functions as (a) an electronic chip issuance function which issues electronic chips in response to predetermined electronic chip issuance operation by a user according to predetermined electronic chip issuance conditions, (b) an electronic chip consumption function which accepts consumption of said electronic chips in response to predetermined electronic chip consumption operation by said user according to predetermined electronic chip consumption conditions, (c) an electronic chip information provision function which provides said user with information related to electronic chips which said user possess as electronic chip information, (d) an electronic chip record management function which manages issuance records of said electronic chips by said electronic chip issuance function and consumption records of said electronic chips by said electronic chip consumption function and (e) an electronic chip condition calculation function which calculates said electronic chip issuance conditions and said electronic chip consumption conditions according to managed contents of said electronic chip record management function, are recorded.

* * * * *